United States Patent
Chen

(10) Patent No.: US 10,311,287 B2
(45) Date of Patent: Jun. 4, 2019

(54) FACE RECOGNITION SYSTEM AND METHOD

(71) Applicant: CLOUD NETWORK TECHNOLOGY SINGAPORE PTE. LTD., Singapore (SG)

(72) Inventor: Po-Cheng Chen, New Taipei (TW)

(73) Assignee: Cloud Network Technology Singapore Pte. Ltd., Singapore (SG)

(*) Notice: Subject to any disclaimer, the term of this patent is extended or adjusted under 35 U.S.C. 154(b) by 274 days.

(21) Appl. No.: 15/276,690

(22) Filed: Sep. 26, 2016

(65) Prior Publication Data

US 2018/0053041 A1    Feb. 22, 2018

(30) Foreign Application Priority Data

Aug. 17, 2016  (CN) .......................... 2016 1 0678294

(51) Int. Cl.
G06K 9/00    (2006.01)

(52) U.S. Cl.
CPC ..... G06K 9/00288 (2013.01); G06K 9/00228 (2013.01); G06K 9/00268 (2013.01)

(58) Field of Classification Search
None
See application file for complete search history.

(56) References Cited

U.S. PATENT DOCUMENTS

| | | | |
|---|---|---|---|
| 9,129,148 B1* | 9/2015 | Li | G06K 9/00268 |
| 9,892,324 B1* | 2/2018 | Pachauri | G06K 9/00751 |
| 2013/0070975 A1* | 3/2013 | Begeja | G06F 16/784 |
| | | | 382/118 |
| 2015/0286638 A1* | 10/2015 | Li | G06K 9/00268 |
| | | | 382/190 |
| 2015/0324632 A1* | 11/2015 | Whitehill | G06K 9/00281 |
| | | | 382/159 |
| 2016/0078280 A1* | 3/2016 | Tai | G06K 9/4609 |
| | | | 382/118 |
| 2017/0076474 A1* | 3/2017 | Fu | G06T 11/00 |
| 2017/0367651 A1* | 12/2017 | Tzvieli | A61M 21/02 |

* cited by examiner

*Primary Examiner* — Iman K Kholdebarin
(74) *Attorney, Agent, or Firm* — ScienBiziP, P.C.

(57) ABSTRACT

A face recognition system for recognizing face in two stages includes a processor and a camera. The camera captures a face image. The processor includes a image locating unit, an image recognition unit, a first feature extraction unit, a second feature extraction unit, and a comparison unit. The image locating unit locates a face in the face image. Facial landmarks are recognized by the image recognition unit and the first feature extraction unit extracts a deep-learning based facial feature. The second feature extraction unit extracts a hand-crafted facial feature. The comparison unit compares the deep-learning based facial feature and the hand-crafted facial feature with a predetermined facial samples library to output a result of facial comparison. A face recognition method is also provided.

18 Claims, 4 Drawing Sheets

FACE RECOGNITION SYSTEM AND METHOD

FIELD

The subject matter herein generally relates to face recognition systems and methods.

BACKGROUND

Conventional face recognition systems adopt approaches based on global features which compare the spatial histograms of local binary patterns (LBP) feature between an image of a subject face and images of multiple training faces. Such a system can effectively recognize a subject face with a frontal face. However, it fails to recognize a subject face image with non-frontal face or if the subject face is a non-training face with unusual facial expression.

BRIEF DESCRIPTION OF THE DRAWINGS

Implementations of the present technology will now be described, by way of example only, with reference to the attached figures.

DETAILED DESCRIPTION

Figure 1:
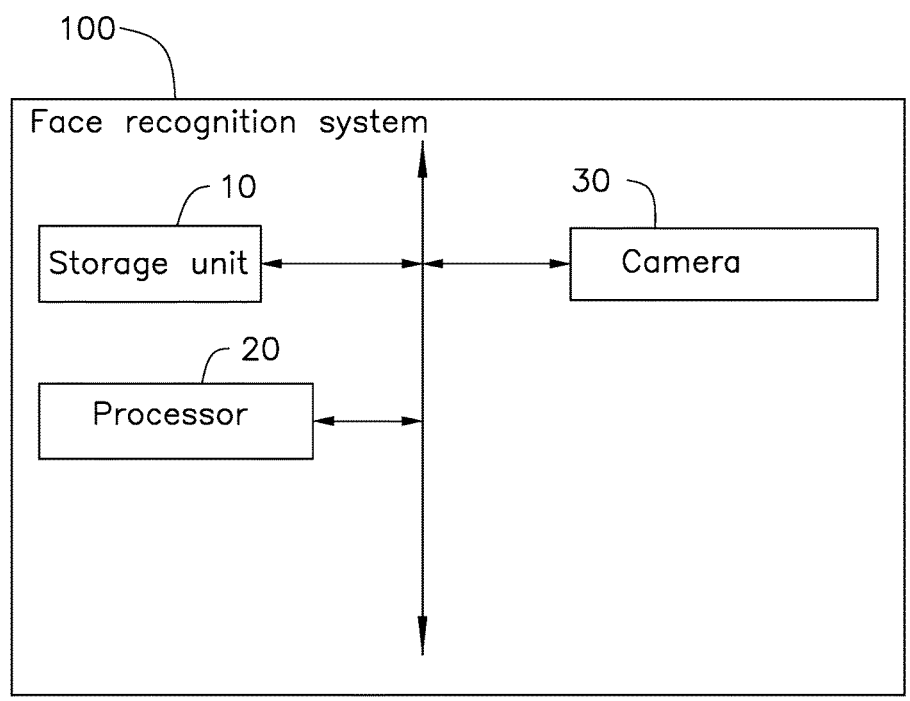
FIG. 1 is a block diagram of an embodiment of a face recognition system of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series, and the like.

The disclosure is described in relation to a face recognition system.

Figure 2:
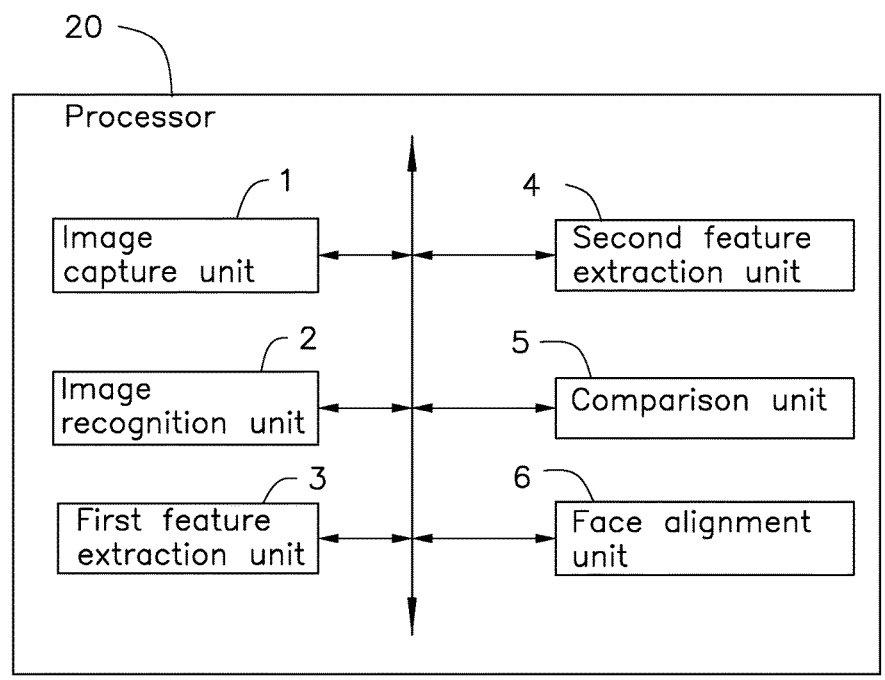
FIG. 2 is a block diagram of an embodiment of a processor of the present disclosure.

Referring to FIG. 1-FIG. 2, the face recognition system 100 can be used in for example a door control system, a human-robot interaction system, or in a surveillance system.

The face recognition system 100 comprises, a storage unit 10, a processor 20, and a camera 30. The processor 20 comprises a image locating unit 1, an image recognition unit 2, a first feature extraction unit 3, a second feature extraction unit 4, and a comparison unit 5. The one or more function modules can include computerized code in the form of one or more programs that are stored in the storage unit 10, and executed by the processor 20 to provide functions of the face recognition system 100.

The camera 30 is configured to capture a face image. The image locating unit 1 is configured to locate a face area in the face image. The image recognition unit 2 is configured to recognize and locate facial landmarks in the face area. The located facial landmarks can comprise two eyes, a nose, a mouth, and a chin of the face image.

The first feature extraction unit 3 is configured to extract a deep-learning based facial feature from the facial landmarks. The second feature extraction unit 4 is configured to extract a hand-crafted facial feature from the facial landmarks.

In one embodiment, the hand-crafted facial feature is extracted from the face image according to a certain manually predefined algorithm based on the expert knowledge.

In one embodiment, the first feature extraction unit 3 can extract the deep-learning based facial feature from the facial landmarks according to a convolutional neural network (CNN) algorithm or a DeepFace recognition algorithm. The second feature extraction unit 4 can extract the hand-crafted facial features from the facial landmarks according to a scale invariant feature transform (SIFT) algorithm, a local binary patterns (LBP) algorithm, or a speed-up robust features (SURF) algorithm.

The comparison unit 5 is configured to compare facial features with a predetermined facial samples library to output a result of facial comparisons. The facial features comprise the deep-learning based facial feature extracted by the first feature extraction unit 3 and the hand-crafted facial feature extracted by the second feature extraction unit 4.

In one embodiment, the predetermined facial samples library can be established by collecting images of multiple training faces, and the face recognition system 100 establishes the predetermined facial sample library before use. Fox example, the image camera 10 captures ten images per training human. Each of the ten images comprises a face area and a background. The first feature extraction unit 3 extracts deep-learning based facial features from the ten training images and the second feature extraction unit 4 extracts hand-crafted facial features from the ten training images to establish the predetermined facial samples library. The predetermined facial samples library comprises multiple humans as training subjects, and each training human comprises multiple images. The number of images of training faces can be greater than ten images or less than ten images.

In one embodiment, John is a training human. The camera 30 captures ten images of John. The first feature extraction unit 3 extracts deep-learning based facial features from the ten images of John and the second feature extraction unit 4 extracts hand-crafted facial features from the ten images of John. The deep-learning based facial features from the ten images of John are used to generate a face classification unit according to a support vector machine (SVM) algorithm. The face classification unit can quickly compare a deep-learning based facial feature of a face image of John with the deep-learning based facial features of the ten images of the training human John.

When the predetermined facial samples library is finished, the face recognition system 100 can be used. The first feature extraction unit 3 and the second feature extraction unit 4 extract a deep-learning based facial feature and a hand-crafted facial feature from a face image. The comparison unit 5 inputs the deep-learning based facial feature of the face image to the face classification unit, and obtains a first result of comparison and a first confidence value. The comparison unit 5 determines whether the first confidence value is greater than a first reference value. When the first confidence value is greater than the first reference value, the comparison unit 5 determines that the first result of comparison is reliable, and the comparison unit 5 outputs the first result as the result of facial comparison.

In one embodiment, a value range of the first confidence value is 0-1.0, and the first reference value is 0.5. When the first confidence value is greater than 0.5, the comparison unit 5 determines that the first comparison result is reliable and does not need further comparison.

When the first confidence value is not greater than the first reference value, the comparison unit 5 determines that the first comparison result is not reliable. The comparison unit 5 needs to use the hand-crafted facial feature of the face image as a further comparison for face recognition. The comparison unit 5 compares the hand-crafted facial feature of the face image with hand-crafted facial features of the multiple persons in the predetermined facial samples library and obtains a second comparison and a second confidence value.

When the result of second comparison is equal to the result of the first comparison and the second confidence value is greater than a second reference value, the comparison unit 5 determines that the first and second results of comparison are both reliable, and the comparison unit 5 outputs the result of first comparison as the result of facial comparison. When the second result is not equal to the first result or the second confidence value is not greater than the second reference value, the comparison unit 5 outputs "unknown" as the result.

In one embodiment, a value range of the second confidence value is 0-1.0, and the second reference value is 0.5. When the second confidence value is greater than 0.5 and the second comparison result is equal to the result of first comparison, the comparison unit 5 determines that the first and second results are both reliable, and the comparison unit 5 outputs the result of first comparison as the result of facial comparison.

When the face recognition system 100 is implemented in a parallel manner, the face recognition system 100 can comprise multiple image locating units 1, multiple image recognition units 2, multiple first feature extraction units 3, multiple second feature extraction units 4, and multiple comparison units 5. It is by these means that the face recognition system 100 can reduce a period of time for the face recognition.

Referring to FIG. 2, the processor 20 further comprises a face alignment unit 6. The face alignment unit 6 is configured to determine whether the facial landmarks are presented at the same level. When the facial landmarks are not at the same level, the face alignment unit 6 is further configured to align the facial landmarks to be at the same level. Then the first feature extraction units 3 and the second feature extraction units 4 extract facial features from the facial landmarks after alignment by the face alignment unit 6.

In one embodiment, the face alignment unit 6 aligns the facial landmarks to the same level according to a three-dimensional coordinate algorithm.

Figure 3:
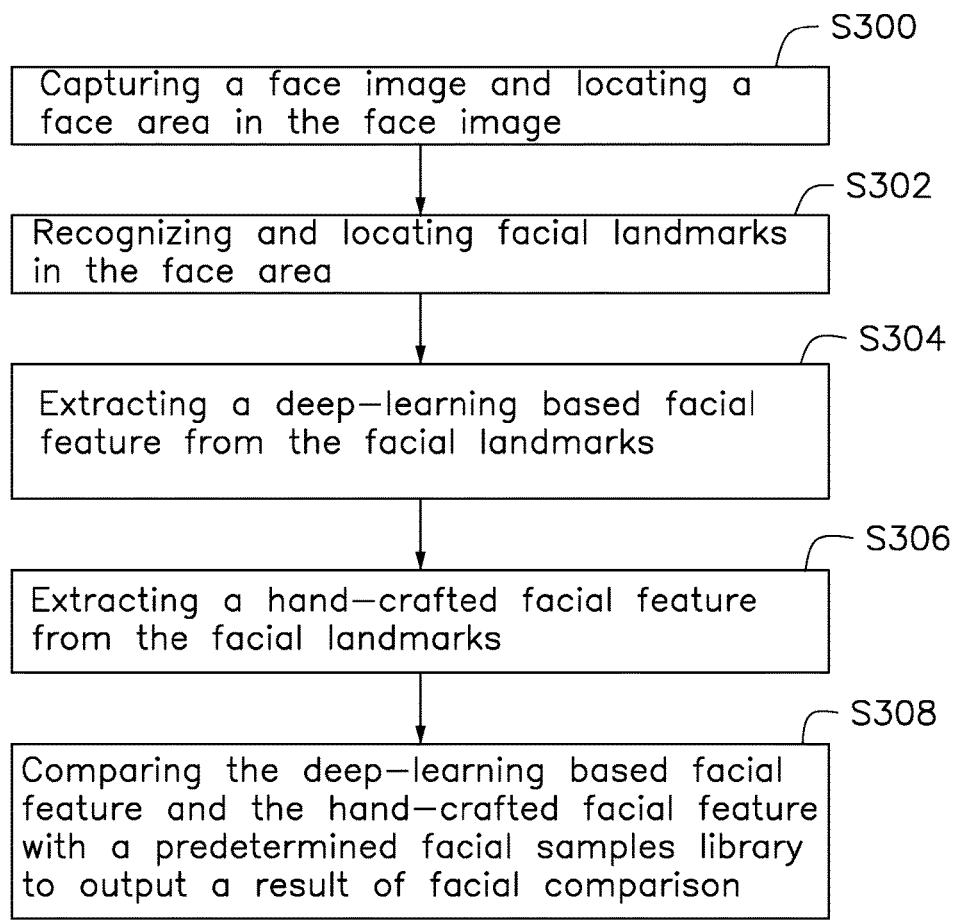
FIG. 3 is a flow diagram of an embodiment of a face recognition method of the present disclosure

FIG. 3 illustrates an embodiment of a face recognition method. The flowchart presents an example embodiment of the method. The example method is provided by way of example, as there are a variety of ways to carry out the method. The method described below can be carried out using the configurations illustrated in FIG. 1 or FIG. 2, for example, and various elements of these figures are referenced in explaining the example method. Each step shown in FIG. 3 represents one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step S300.

In step S300, the camera 30 captures the face image and the image locating unit locates the face area in the face image.

In step S302, the image recognition unit 2 recognizes and locates the facial landmarks of the face area. The facial landmarks comprise two eyes, a nose, a mouth, and a chin.

In step S304, the first feature extraction unit 3 extracts the deep-learning based facial feature from the facial landmarks.

In step S306, the second feature extraction unit 4 extracts the hand-crafted facial feature from the facial landmarks.

In step S308, the comparison unit 5 compares the facial features with the predetermined facial samples library to output the result of facial comparison. The facial features so compared comprise the deep-learning based facial feature and the hand-crafted facial feature.

In one embodiment, the step S304 and the step S308 can be executed in parallel.

Figure 4:
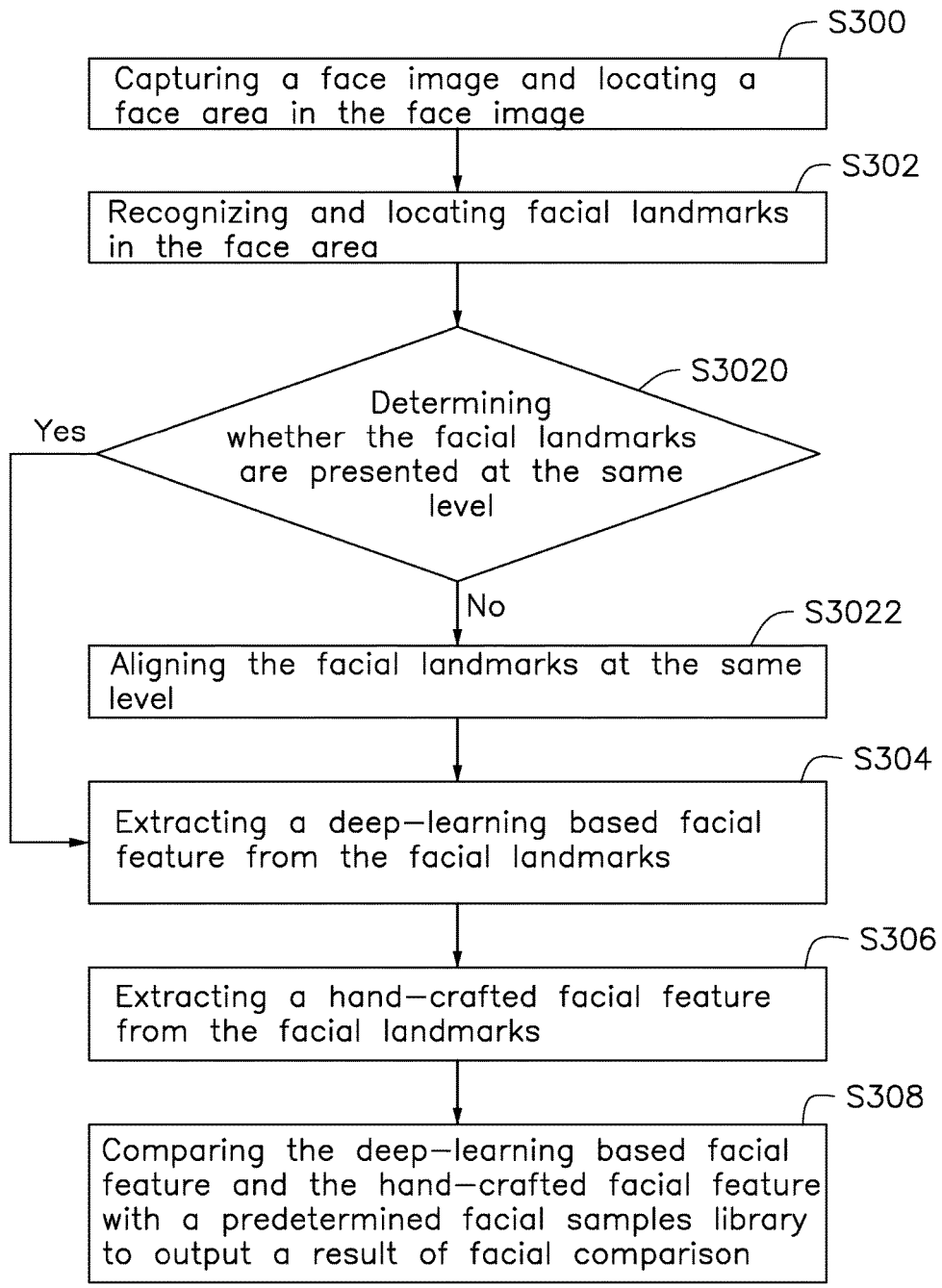
FIG. 4 is a flow diagram of an another embodiment of a face recognition method of the present disclosure.

Referring to FIG. 4, the face recognition method further comprises a step S3020 and a step S3022 between the step S302 and the step S304.

In step S3020, the face alignment unit 6 determines whether the facial landmarks are presented at the same level.

In step S3022, the face alignment unit 6 aligns the facial landmarks to the same level if the facial landmarks are not presented as level in an image. If not required, proceed to step S304.

In one embodiment, in the step S304, the first feature extraction unit 3 can extract the deep-learning based facial feature from the facial landmarks according to the CNN algorithm or the DeepFace recognition algorithm. In the step S306, the second feature extraction unit 4 can extract the hand-crafted facial feature from the facial landmarks according to the SIFT algorithm, the LBP algorithm, or the SURF algorithm.

In one embodiment, in the step S308, the comparison unit 5 inputs the deep-learning based facial feature of the face image to the face classification unit, and obtains the result of first comparison and the first confidence value. The comparison unit 5 determines whether the first confidence value is greater than the first reference value. When the first confidence value is greater than the first reference value, the comparison unit 5 determines that the result of first comparison is reliable, and the comparison unit 5 outputs such result as the result of facial comparison.

When the first confidence value is not greater than the first reference value, the comparison unit 5 determines that the result of first comparison is not reliable. The comparison unit 5 uses the hand-crafted facial feature of the face image as the further comparison for face recognition. The comparison unit 5 compares the hand-crafted facial feature of the face image with the hand-crafted facial features of the multiple persons in the predetermined facial samples library and obtains the result of second comparison and the second confidence value.

When the first and second results of comparison are equal and the second confidence value is greater than the second reference value, the comparison unit 5 determines that the first and second results of comparison are both reliable, and the comparison unit 5 outputs the first result as the result of facial comparison. When the first and second results of comparison are not equal or the second confidence value is not greater than the second reference value, the comparison unit 5 outputs "unknown" as the result of facial comparison.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A face recognition system comprising:
    a storage configured to store a plurality of units, the plurality of units being a collection of instructions of an application operable in the system;
    a camera, configured to capture a face image; and
    a processor configured to execute the plurality of units, the plurality of units comprising:
        a image locating unit, configured to locate a face area in the face image;
        a image recognition unit, configured to recognize and locate facial landmarks in the face area;
        a first feature extraction unit, configured to extract a deep-learning based facial feature from the facial landmarks;
        a second feature extraction unit, configured to extract a hand-crafted facial feature from the facial landmarks; and
        a comparison unit, configured to compare facial features with a predetermined facial samples library to output a result of facial comparison;
    wherein the facial features comprise the deep-learning based facial feature and the hand-crafted facial feature;
    wherein the predetermined facial samples library comprises a face classification unit, the face classification unit is generated by multiple deep-learning based facial features extracted from multiple facial samples; and
    wherein the comparison unit inputs the deep-learning based facial feature extracted by the first feature extraction unit to the face classification unit, and obtains a first comparison result and a first confidence value; and the comparison unit determines whether the first confidence value is greater than a first reference value, and the comparison unit outputs the first comparison result as the result of facial comparison in response to the first confidence value being greater than the first reference value.

2. The face recognition system of claim 1, wherein the facial landmarks comprise two eyes, a nose, a mouth, and a chin of the face image.

3. The face recognition system of claim 1, wherein the processor further comprises a face alignment unit; the face alignment unit is configured to determine whether the facial landmarks are presented at the same level, when the facial landmarks are not at the same level, the face alignment unit is further configured to align the facial landmarks to be at the same level.

4. The face recognition system of claim 1, wherein the first feature extraction unit is configured to extract the deep-learning based facial feature from the facial landmarks according to a convolutional neural network (CNN) algorithm.

5. The face recognition system of claim 1, wherein the second feature extraction unit is configured to extract the hand-crafted facial feature from the facial landmarks according to a scale invariant feature transform (SIFT) algorithm.

6. The face recognition system of claim 1, wherein the predetermined facial samples library further comprises multiple hand-crafted facial features extracted from the multiple facial samples; the multiple deep-learning based facial features extracted from the multiple facial samples generate the face classification unit according to a support vector machine (SVM) algorithm; and the multiple facial samples are captured from the same person.

7. The face recognition system of claim 1, wherein when the first confidence value is not greater than the first reference value, the comparison unit compares the hand-crafted facial feature extracted by the second feature extraction unit with the multiple hand-crafted facial features extracted from the multiple facial samples and obtains a second comparison result and a second confidence value; and when the second comparison result is equal to the first comparison result and the second confidence value is greater than a second reference value, and the comparison unit outputs the first comparison result as the result of facial comparison.

8. The face recognition system of claim 7, wherein when the second comparison result is not equal to the first comparison result or the second confidence value is not greater than the second reference value, and the comparison unit outputs a unknown as the result of facial comparison.

9. The face recognition system of claim 8, wherein value ranges of the first confidence value and the second confidence value are 0-1.0.

10. A face recognition method, comprising:
    capturing a face image and locating a face area in the face image;
    recognizing and locating facial landmarks in the face area;
    extracting a deep-learning based facial feature from the facial landmarks;
    extracting a hand-crafted facial feature from the facial landmarks; and
    comparing facial features with a predetermined facial samples library to output a result of facial comparison;
    wherein the facial features comprise the deep-learning based facial feature and the hand-crafted facial feature;
    wherein the predetermined facial samples library comprises a face classification unit, the face classification unit is generated by multiple deep-learning based facial features extracted from multiple facial samples; and
    wherein the step of comparing facial features with a predetermined facial samples library and output a result of facial comparison comprises:
        inputting the deep-learning based facial feature to the face classification unit and obtaining a first comparison result and a first confidence value;
        determining whether the first confidence value is greater than a first reference value; and outputting the first comparison result as the result of facial comparison in response to the first confidence value being greater than the first reference value.

11. The face recognition method of claim 10, wherein the facial landmarks comprise two eyes, a nose, a mouth, and a chin of the face image.

12. The face recognition method of claim 10, wherein the step of recognizing and locating facial landmarks in the face area comprises:
   determining whether the facial landmarks are presented at the same level;
   if not, aligning the facial landmarks at the same level; and
   if yes, processing the extracting step.

13. The face recognition method of claim 10, wherein the step of extracting a deep-learning based facial feature from the facial landmarks comprises:
   extracting the deep-learning based facial feature from the facial landmarks according to a CNN algorithm.

14. The face recognition method of claim 10, wherein the step of extracting a hand-crafted facial feature from the facial landmarks comprises:
   extract the hand-crafted facial feature from the facial landmarks according to a SIFT algorithm.

15. The face recognition method of claim 10, wherein the predetermined facial samples library further comprises multiple hand-crafted facial features extracted from the multiple facial samples; the multiple deep-learning based facial features extracted from the multiple facial samples generate the face classification unit according to a support vector machine (SVM) algorithm; and the multiple facial samples are captured from the same person.

16. The face recognition method of claim 10, wherein the step of comparing facial features with a predetermined facial samples library and output a result of facial comparison further comprises:
   comparing the hand-crafted facial feature with the multiple hand-crafted facial features extracted from the multiple facial samples in response to the first confidence value being not greater than the first reference value, and obtaining a second comparison result and a second confidence value;
   outputting the first comparison result as the result of facial comparison in response to the second comparison result being equal to the first comparison result and the second confidence value being greater than a second reference value.

17. The face recognition method of claim 16, wherein the step of comparing facial features with a predetermined facial samples library and output a result of facial comparison further comprises:
   outputting a unknown as the result of facial comparison in response to the second comparison result being not equal to the first comparison result or the second confidence value being not greater than the second reference value.

18. The face recognition method of claim 17, wherein value ranges of the first confidence value and the second confidence value are 0-1.0.

* * * * *